US012679025B2

(12) United States Patent
Rubio Castillo et al.

(10) Patent No.: US 12,679,025 B2
(45) Date of Patent: Jul. 14, 2026

(54) DISPENSING PRINT AGENT FROM PRINT BARS

(71) Applicant: Peridot Print LLC, Palo Alto, CA (US)

(72) Inventors: Leticia Rubio Castillo, Sant Curgat del Valles (ES); Sergio Gonzalez Martin, Sant Cugat del Valles (ES)

(73) Assignee: Peridot Print LLC, Palo Alto, CA (US)

( * ) Notice: Subject to any disclaimer, the term of this patent is extended or adjusted under 35 U.S.C. 154(b) by 284 days.

(21) Appl. No.: 18/024,756

(22) PCT Filed: Oct. 1, 2020

(86) PCT No.: PCT/US2020/053800
§ 371 (c)(1),
(2) Date: Mar. 4, 2023

(87) PCT Pub. No.: WO2022/071956
PCT Pub. Date: Apr. 7, 2022

(65) Prior Publication Data
US 2023/0311411 A1     Oct. 5, 2023

(51) Int. Cl.
B29C 64/209     (2017.01)
B22F 10/14      (2021.01)
B22F 10/30      (2021.01)
B29C 64/165     (2017.01)
B29C 64/393     (2017.01)
B33Y 10/00      (2015.01)
B33Y 30/00      (2015.01)
B33Y 50/02      (2015.01)

(52) U.S. Cl.
CPC ............ B29C 64/209 (2017.08); B22F 10/14 (2021.01); B22F 10/30 (2021.01); B29C 64/165 (2017.08); B29C 64/393 (2017.08); B33Y 10/00 (2014.12); B33Y 30/00 (2014.12); B33Y 50/02 (2014.12); *B22F 2998/10* (2013.01)

(58) Field of Classification Search
CPC .... B29C 64/209; B29C 64/393; B29C 64/165
See application file for complete search history.

(56) References Cited

U.S. PATENT DOCUMENTS

| | | | |
|---|---|---|---|
| 7,118,188 B2 | 10/2006 | Mlanova et al. | |
| 7,387,359 B2 | 6/2008 | Hernandez et al. | |
| 8,857,938 B2 | 10/2014 | Enge et al. | |

(Continued)

FOREIGN PATENT DOCUMENTS

| | | | | |
|---|---|---|---|---|
| WO | WO-2018226211 A1 | * | 12/2018 | ........... B29C 64/393 |
| WO | 2019/209247 A1 | | 10/2019 | |

*Primary Examiner* — Nahida Sultana
(74) *Attorney, Agent, or Firm* — Michael Dryja

(57)     ABSTRACT

In an example, a method comprises dispensing a first print agent onto a layer of build material in an additive manufacturing apparatus. The additive manufacturing apparatus may have a first print bar and a second print bar. The method may comprise determining a pattern of a first print agent to be applied to a layer of build material, dispensing a first portion of the determined pattern of the first print agent onto the layer of build material from the first print bar and dispensing a second portion of the determined pattern onto the layer of build material from the second print bar.

12 Claims, 4 Drawing Sheets

(56) References Cited

U.S. PATENT DOCUMENTS

| | | | |
|---|---|---|---|
| 9,707,753 B2 * | 7/2017 | Chen | B41J 2/14 |
| 9,782,978 B2 * | 10/2017 | Chung | H04N 1/2307 |
| 10,625,518 B2 | 4/2020 | Lau | |
| 11,292,257 B2 * | 4/2022 | Chen | B41J 2/1637 |
| 11,583,920 B2 * | 2/2023 | Kasperchik | B22F 10/14 |
| 2003/0081227 A1 | 5/2003 | Williams et al. | |
| 2016/0001554 A1 * | 1/2016 | Chen | B41J 2/14024 |
| | | | 347/50 |
| 2016/0325506 A1 | 11/2016 | Puigardeu Aramendia et al. | |
| 2016/0339695 A1 * | 11/2016 | Chen | B41J 2/14032 |
| 2017/0297111 A1 * | 10/2017 | Myerberg | B28B 1/001 |
| 2017/0313062 A1 * | 11/2017 | Rubio | B41J 2/2146 |
| 2018/0018546 A1 * | 1/2018 | Rubio | G06K 15/107 |
| 2018/0168049 A1 * | 6/2018 | Chen | H05K 3/284 |
| 2018/0244042 A1 * | 8/2018 | Dowell | B41J 2/1433 |
| 2018/0319168 A1 * | 11/2018 | Wagner | B41J 2/005 |
| 2018/0326728 A1 * | 11/2018 | Clark | B41J 29/38 |
| 2019/0111619 A1 | 4/2019 | Schalk et al. | |
| 2019/0143711 A1 * | 5/2019 | Peinado | B41J 2/04561 |
| | | | 347/19 |
| 2019/0202127 A1 * | 7/2019 | Ng | B22F 1/10 |
| 2020/0108599 A1 * | 4/2020 | Axten | B29C 64/393 |
| 2020/0139700 A1 * | 5/2020 | Linn | B41J 2/0455 |

* cited by examiner

Determine pattern of 1ˢᵗ print agent to be applied to layer of build material        ~ 102

Dispense 1ˢᵗ portion of 1ˢᵗ print agent from 1ˢᵗ print bar        ~ 104

Dispense 2ⁿᵈ portion of 1ˢᵗ print agent from 2ⁿᵈ print bar        ~ 106

DISPENSING PRINT AGENT FROM PRINT BARS

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used. In some such examples, print agents may be applied to the layer of build material, for example to control which portions of the build material solidifies.

BRIEF DESCRIPTION OF DRAWINGS

Non-limiting examples will now be described with reference to the accompanying drawings, in which.

DETAILED DESCRIPTION

Figure 1:
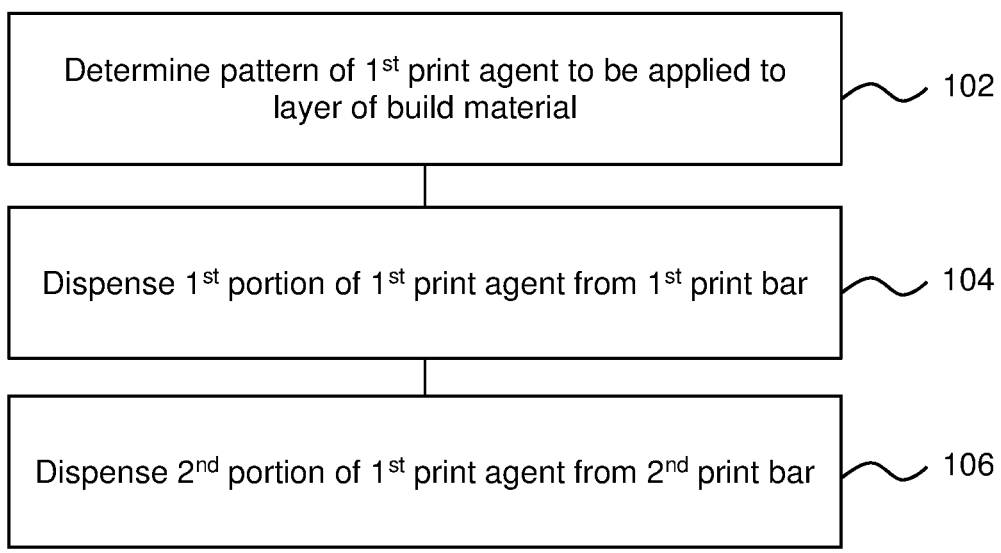
FIG. 1 is an example of a method of dispensing print agent in additive manufacturing.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber.

According to one example, a suitable build material may be a plastic such as PA12 build material commercially referred to as V1 R10A "HP PA12" available from HP Inc. In another example, metal powder, such as steel powder, may be used as the build material. For example, powdered steel alloy known as 316L and 17-4PH may be used for generating metal objects.

In some examples of additive manufacturing, selective solidification is achieved through directional application of energy, for example using a laser or electron beam which results in solidification of build material where the directional energy is applied. In other examples, at least one print agent may be selectively applied to the build material and may be liquid when applied. The print agent may for example comprise a fusing agent, a coalescence modifier agent (e.g. a detailing agent), a binding agent and/or some other kind of print agent, as described in more detail below.

Such print agents may for example be dispensed using inkjet or similar liquid distribution technologies.

For example, a fusing agent (also termed a 'coalescence agent' or 'coalescing agent') may be selectively distributed onto portions of a layer of build material in a pattern derived from data representing a slice of a three-dimensional object to be generated (which may for example be determined from structural design data). The fusing agent may have a composition which absorbs energy such that, when energy (for example, heat) is applied to the layer, the build material to which it has been applied heats up, coalesces and solidifies, upon cooling, to form a slice of the three-dimensional object in accordance with the pattern. According to one example, a suitable fusing agent may be an ink-type formulation comprising carbon black, such as, for example, the fusing agent formulation commercially referred to as V1Q60A "HP fusing agent" available from HP Inc. Such a fusing agent may comprise any or any combination of an infra-red light absorber, a near infra-red light absorber, a visible light absorber and a UV light absorber. Examples of fusing agents comprising visible light absorption enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance of an object, and such agents may therefore be termed detailing agents. In some examples, detailing agent may be used near edge surfaces of an object being printed to reduce coalescence. According to one example, a suitable detailing agent may be a formulation commercially referred to as V1Q61A "HP detailing agent" available from HP Inc.

In some examples, the print agent may comprise a binder agent, or binding agent, which may be selectively distributed onto portions of a layer of build material in a pattern derived from data representing a slice of a three-dimensional object to be generated (which may for example be generated from structural design data as described above). The binding agent may have a composition which absorbs energy such that, when energy (for example, heat) is applied to build material to which binding agent has been applied, the build material and binding agent are caused to become bound together to form the three-dimensional object in accordance with the design data.

Different types of binding agent may be used. In some examples, thermally curable binding agents may be used. When heat is applied to build material to which thermally curable binding agent has been applied, particles (e.g. latex particles) in the binding agent may be caused to bind together, thereby binding the build material together in a binder matrix. In other examples, an ultraviolet (UV) curable binding agent may be used. When UV energy is applied to build material to which UV curable binding agent has been applied, components in the binding agent are caused to polymerize, thereby binding the build material together in a binder matrix.

According to one example, a suitable binding agent may be an ink-type formulation. In one example such a binding agent may additionally comprise a UV light absorber. In other examples, a water-based binding agent may be used. Such a binding agent may be formulated with a polymer that binds particles of build material together at positions where the binding agent is delivered. Capillary forces may pull the binding agent into small interstices between the particles to produce a uniform binder distribution. Such binding agents may, in some examples, be used with metal build materials.

In some examples, a binding agent may be used to form a 'green part'. In a green part, particles are held together but the object may be relatively fragile or breakable. In such examples, the green part may be placed in a furnace at high temperature to be sintered. Sintering may involve heating the green part to cause the material therein to solidify and compact, in some cases without melting. This may result in a more robust object.

A coloring agent, for example comprising a dye or colorant, may in some examples be used as a fusing agent, a coalescence modifier agent and/or a binding agent, and/or as a print agent to provide a particular color for the object.

In some examples, it may be possible that dispensing print agents may disturb build material. Without wishing to be bound by theory, a levelled layer of powder or powder-like build material as described above may be disturbed by air flows caused by falling drops of agent. This in turn may cause manufacturing quality issues in objects generated using additive manufacturing. For example, the dimensions of the object may be disrupted or inconsistent. Such effects may be particularly apparent in relation to finely powdered build materials, such as some examples of metal powders. In some example, the air flows may change the shape of drop of agent as it falls, in some cases causing satellite drops to form. These may fall on to the build material at a location other than the intended location.

FIG. 1 is an example of a method, which may comprise a method of additive manufacturing. More particularly, the method may be carried out by an additive manufacturing apparatus having first and second print bars. In some examples, the first and second print bar are separated in the direction of travel. In some examples, there may be a first print die on the first print bar and a second print die on the second print bar. In some such examples, the first and second print dies may be offset from one another in a direction transverse (or othogonal) to a direction of travel (although in some examples there may be an overlap in this direction as discussed below). In some examples, each print bar/print die may comprise a plurality of nozzles, wherein each of the nozzles may eject print agent when controlled to do so. For example, print agent may be ejected using inkjet or bubble jet technologies. Provision of multiple print bars allows for redundancy and/or error correction in the event that a print die, or a nozzle thereof, becomes non-operational.

As noted above, the first and second print bar may be physically separated (i.e. spaced) from one another in a direction to the direction of travel. In some examples, the second print bar may pass over a print bed after the first print bar at least in a first direction of printing (with the order potentially being reversed in a second direction of printing if printing is carried out bidirectionally). In some examples, nozzles and/or print dies of different print bars may at least partially overlap in a direction transverse to the direction of printing, such that a portion of the print bed may be addressed by either the first or second print bar. The separation between the print bars may for example be a separation of less than 1 cm, between 1 cm and 10 cm, or some other separation.

The method of FIG. 1 comprises, in block 102, determining a pattern of a first print agent to be applied to a layer of build material. For example, the pattern may be derived from data representing a slice of a three-dimensional object to be generated as described above. The pattern may, in some examples, define an amount of the print agent to be applied to each of a plurality of print addressable locations on the layer of build material, for example to form a layer of the object.

The method further comprises, in block 104, dispensing a first portion of the pattern of print agent onto a layer of build material from the first print bar (e.g. a print die provided on the first print bar) and, in block 106, dispensing a second portion of the pattern of first print agent on to the layer of build material from the second print bar (e.g. a print die provided on the second print bar). In other words, while part of the pattern is printed by the first print bar, another part of the pattern is printed by the second print bar.

For example, the print bar(s) may be mounted on or in a moveable carriage, which scans the print bars over a print bed on which a build material layer is formed. Such 'scans' are referred to herein as printing passes, or simply passes. As a print bar moves, it may be selectively controlled to dispense print agent, for example from each of a plurality of nozzles, which may therefore fall on a region of the build material layer which is (at least substantially) directly below the nozzle at that point in its pass. In some examples, the print bars may be substantially aligned so that they scan over approximately the same region of a print bed, one following the other. Moreover, individual nozzles of the print bars may address the same locations on the print bed/build material layer. For example, a location on the print bed may be addressable by a nozzle of a print die of the first print bar, or by a nozzle of a print die of the second print bar.

Dividing the print agent ejection between two print bars which are separate (and may be separated in the direction of travel) allows there to be an increased distance between ejected drops of print agent. This in turn reduces the possibility of interactions between drops and in some examples increases the regularity of the shapes of the drops themselves. For example, when drops are distributed close to one another, they may mutually interact, for example as a result of an airflow therebetween. Specific examples are discussed in greater detail below.

Figure 2:
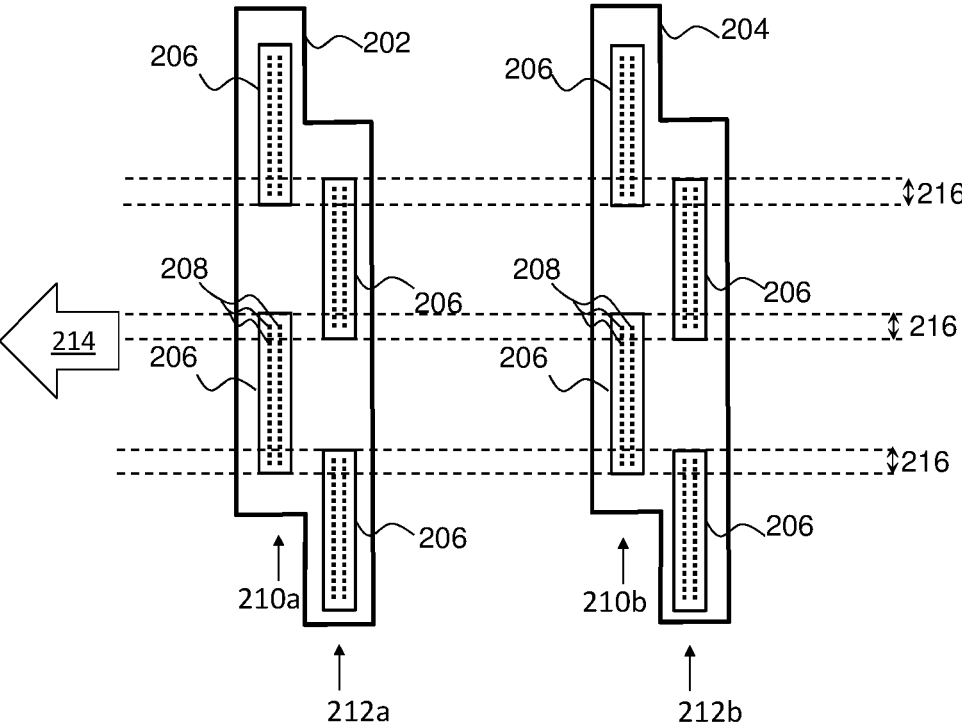
FIG. 2 is a schematic diagram of an example arrangement of print bars.

FIG. 2 shows an example of a print bar arrangement for use in additive manufacturing, which may for example be included in an apparatus used to carry out the method of FIG. 1.

In this example, a first print bar 202 and a second print bar 204 are provided. The print bars 202, 204, may for example be mounted on a common carriage or separate carriages which are movable such that they can be swept over a print bed of an additive manufacturing apparatus, wherein at least one object is to be generated from layers of build material provided on the print bed. The print bars 202, 204 may be substantially aligned such that each sweeps over the same region of the print bed.

In this example, each print bar 202, 204 comprises a plurality of print dies 206 and each of the print dies 206 comprises a plurality of nozzles 208 (only some of which are labelled to avoid overcomplicating the Figure). In this example, there are two columns of nozzles 208 in each print die 206 but this may not be the case in all examples. While in this example, each print bar 202, 204 comprises four print dies 206, in other examples, other numbers of dies may be provided. In this example, each print bar 202, 204 comprises a set of print dies 206, which are arranged in two rows: a first row 210a, 210b and a second row 212a, 212b. The nozzles 208 of the first row 210a, 210b lead the nozzles 208 of the second row 212a, 212b in a first printing direction 214. However, it may be the case that the dies 206 are controlled to eject print agent whilst travelling bidirectionally (i.e. backwards and forwards) over the print bed and therefore the second row 212*a*, 212*b* may lead the first row 210*a*, 210*b* in a second printing direction, which may be opposed to the first printing direction 214.

In this example, the print bars 202, 204 have a shape such that additional print bars may be provided below and/or above each of the print bars 202, 204 as they are shown in the Figure, and so continue the pattern of print dies 206. However, in other examples, the print bars 202, 204 may have different shapes.

The rows 210, 212 of print dies 206 are arranged transverse (i.e. othogonal) to the first printing direction 214, and the dies 206 in each row are offset or staggered, such that spaces between the dies of a first row are aligned with dies of the second row and vice versa. Therefore, a given location on a print bed may generally be addressed by a die of the first row or a die of the second row. However, in this example, the dies 206 of the first row 210 overlap the dies of the second row 212 in an overlap region 216. The overlap region can also be seen between the dies of different print bars, so that the dies of the first row 210*a* of the first print bar 202 have an overlap in the overlap region 216 with the dies 206 of the second row 212*b* of the second print bar 204, and the dies of the first row 210*b* of the second print bar 204 have an overlap in the overlap region 216 with the dies 206 of the second row 212*a* of the first print bar 202. Providing such an overlap may avoid gaps between locations addressable by print dies 206 caused by, for example, manufacturing errors. In other examples, there may be a single print die on a print bar. In such an example, the overlap region may extend along the whole, or substantially the whole, of the print dies.

In this example, the dies 206 of the first row 210*a* of the first print bar 202 are aligned with (i.e. are intended to address the same print addressable locations as) the dies of the first row 210*b* of the second print bar 204. In addition, the dies 206 of the second row 212*a* of the first print bar 202 are aligned with the dies 206 of the second row 212*b* of the second print bar 204. In this example, dies are considered to be 'aligned' when they each can address the same swath of a print bed. In other words, either of a first print die and a second print die, which is aligned with the first print die, may substantially address the same locations on the print bed (or a layer of build material formed thereon). Viewed another way, a given location, or set of locations, on the print bed/layer may be addressed by at least two aligned print dies.

The provision of multiple print bars can mean that an additive manufacturing apparatus has redundancy in the case of blocked nozzles, and may reduce the duty cycle of each nozzle thereby increasing longevity of the components. For example, in a scheme to enhance nozzle redundancy, a subset of nozzles 208 (for example the first column of nozzles 208) in each die 206 may be used to eject a first print agent while a second subset of nozzles 208 (for example the second column of nozzles 208) in each die may be used to eject a second print agent. In the case that the columns are assigned to a given agent, a given location may be addressed by a nozzle of a print die 206 of the first print bar 202 or by a nozzle of a print die 206 of the second print bar 204 when delivering either agent. Thus, if any particular nozzle becomes blocked, a given location may be addressed by the corresponding nozzle of the other print bar. Areas of the print bed which are addressed by nozzles 208 in the overlap region 216 may be associated with a greater degree of redundancy as any such location may be addressed by one of four nozzles.

Thus, in some examples, it may be the case that, for example, the leading column of nozzles 208 in the print direction of each print die 206 is associated with a first print agent and the other column of nozzles 208 of each print die 206 is associated with a second print agent. More generally however, the nozzles may be divided in some other way, such that a first subset of nozzles 208 of a given print die 206 may be associated with (e.g. dedicated to dispensing) the first print agent and a second subset of nozzles 208 of the print die 206 may be associated with, or dedicated to dispensing, the second print agent, wherein the first and second subset are mutually exclusive.

However, when different nozzles 208 of a print die 206 are used to eject a different type of print agent in the same printing pass, potentially substantially simultaneously, there is an increased risk of these two print agent drops interfering, both physically (i.e. drops of different agent may land on a print bed at a same location) and in terms of generating airflows, which may disturb the build material layer and/or impact drop shape. More generally, as outlined above, dispensing drops of agent relatively close together may cause airflows which may disturb the build material layer and/or impact drop shape.

When printing using a multiple print bar arrangement, there are many schemes which could be used to control which nozzle of which print bar is used to eject print agent. This may be controlled through use of 'printing masks'. These masks may be binary masks which may be applied to print instructions. For example, if print instructions specify the placement of a drop of a particular agent on a particular location of the print bed, and this particular location is addressable by a first print die and a second print die, a mask may be used to enable a nozzle of the first print die and not a nozzle of the second print die or vice versa.

In one example of a scheme, the distribution of print agent may be evenly distributed between the print dies. For example, where a location may be addressed by a first print die or a second print die in a given printing pass, there may be a 50% probability that a particular print die is used in that printing pass. Where a location may be addressed by one of four print dies in a given printing pass, there may be a 25% probability that a particular print die is used in that printing pass. Particular schemes which are associated with addressing print beds so as to reduce airflows are discussed below.

Figures 3A, 3B, 3C, 3D:
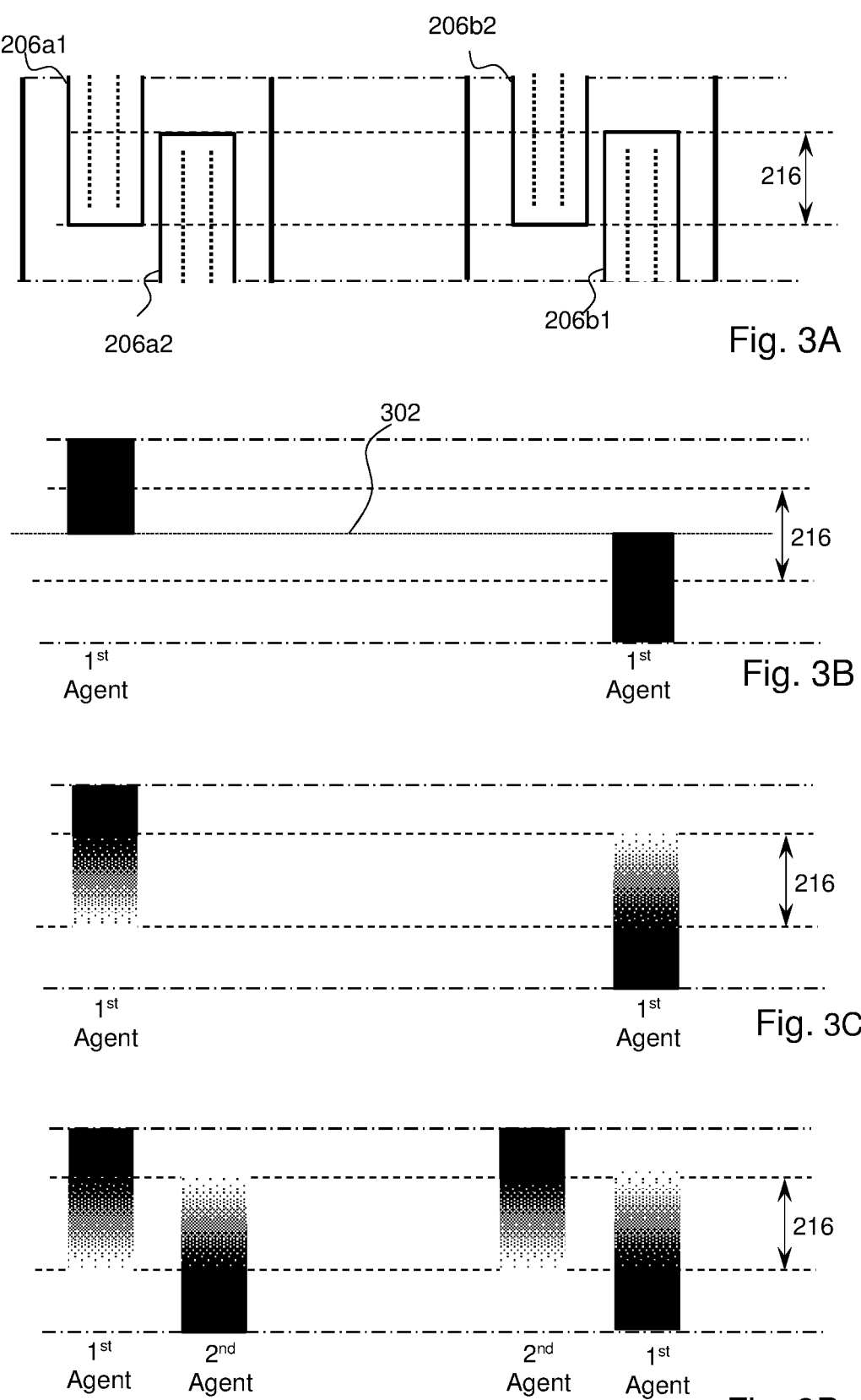
FIGS. 3A-D schematically show examples of how printing masks may be applied.

FIG. 3A shows a close-up of the overlap region 216 of the first print die 206*a*1 of the first row 210*a* of the first print bar 202, a second print die 206*b*1 of the first row 212*b* of the second print bar 204, a third print die 206*a*2 of a second row 212*b* of the first print bar 202, and a fourth print die 206*b*2 of a second row 212*b* of the second print bar 204.

FIGS. 3B to 3D represent examples of schemes for distributing print agent from the different print dies according to the method of FIG. 1. In some examples, these schemes may be referred to as 'weaving' strategies or print masks. In these Figures, which are aligned on the page to illustrate which print die/print bar is used to dispense print agents, black indicates the whole amount of print agent specified in print instructions is to be dispensed whereas lighter colours indicate a lesser amount of print agent is to be dispensed (which may mean that fewer drops and/or smaller drops are dispensed when compared to the amount specified in print instructions), with white indicating that no print agent is to be dispensed. In this example, the masks may extend beyond the portion shown to be black outside an overlap region, and may effectively apply along the length of each print die 206 and to a swath of print instructions which is associated with each print die. In some examples herein, each mask may be associated with a region of the print instructions which is in turn associated with nozzles of a print die 206 which are to dispense a print agent associated with that mask (and not with nozzles which are intended to dispense another print agent).

It may be noted that, in at least some examples, the weaving strategies/masks are used to determine a weaving strategy for print agent to be applied by different print bars. In other words, the weaving strategies are applied between print bars, rather than to print dies within a print bar.

In a first example, shown in FIG. 3B, a 'sharp' strategy is used to divide a first print agent between the print dies 206 of the first row 210a of the first print bar 202 and the print dies 206 of the second row 212b of the second print bar 204. As can be seen from, for example, FIG. 2, the first row 210a of the first print bar 202 and the second row 212b of the second print bar 204 can together address a continuous underlying region of the print bed. Moreover, as the rows 210a and 212b are relatively distant from one another (when compared to the spacing of rows of within a print bar), drops of print agent issued from the first print bar 202 will have little impact on drops of print agent issued from the second print bar 204.

In this way, airflows, which may otherwise be seen between drops issued from nozzles in the overlap region of print dies on the same print bar, will be avoided. As will be appreciated, where drops are issued by nozzles which are close together, the possibility for print agent drops to interact is increased. Airflows, which may be referred to as thermal inkjet wind, may be produced. Such airflows can cause drops of print agent to split, producing smaller satellite drops which fall at unexpected positions. This has been observed to particularly impact the overlap region between dies arranged with an overlap as shown in FIGS. 2 and 3A. Moreover, in examples set out herein, such airflows can disrupt build material, for example disrupting a levelled layer of build material on to which the print agent is to be dispensed.

Thus, in the first example shown in FIG. 3B, print agent is issued to address the overlap region from the first print die 206a1 and the second print die 206b2. Each of these print dies is to use the nozzles up to a dividing line 302 to issue the full amount of print agent specified. For example, the amount of print agent to be applied to a given location on a layer of build material may be specified in print instructions derived from structural design data describing one or more objects to be generated. The amount of print agent to be applied at a given location may vary based on, for example, thermal considerations. However, if the masks shown in FIG. 3B are used, if the location corresponds to a region above the dividing line 302, it is addressed by a nozzle of the first print die 206a1 (which is on the first print bar 202); if the location corresponds to a region below the dividing line 302, it is addressed by a nozzle of the second print die 206b2 (which is on the second print bar 204). The mask operates to distribute the application of print agent between print dies 206 of different print bars 202, 204.

It may be noted that, according to the weaving strategy shown in FIG. 3B, the second row 212a of print dies 206 of the first print bar 202 and the first row 210b of print dies 206 of the second print bar 204 are not used to dispense print agent. While this may be acceptable in some circumstances, in other examples a minimal amount of the first print agent may be distributed from these dies. This may help keep nozzles clear (as nozzles which are unused for a period of time may be associated with an increased risk of clogging). Thus, in some examples, a minimal amount of the first print agent is ejected from these nozzles, for example to meet a maintenance specification. In another example, a nozzle may be blocked, and the nozzle providing redundancy for that nozzle may be caused to dispense print agent in its place. In another example, in a second printing pass, the printing masks may be applied to the print dies of the second row 212a of print dies of the first print bar 202 and the first row 210b of print dies 206 of the second print bar 204. In other words, the print dies used may be different for different printing passes, for example alternating. This may also reduce the risk of clogging. While in this case the drops of print agent will be closer to each other than in the example shown in FIG. 3B, it may be noted that the spacing between the print bars may be greater than the spacing between print dies of the same print bar. For example, the separation between the print bars may be of the order of one or more centimetres whereas the separation between print dies of the same print bar may be of the order of one or more millimetres.

In another example these print dies, unused in FIG. 3B, may be used to dispense a second agent. One such example is discussed in greater detail in relation to FIG. 3D below.

In summary, the weaving strategy provided in FIG. 3B allocates all locations within the overlap region and above the dividing line 302 to be addressed by nozzles 208 of a print die of the first print bar (in particular, in this example, the first print die 206a1) and all locations within the overlap region and below the dividing line to be addressed by nozzles 208 of a print die of the second print bar (in particular, in this example, the second print die 206b1). It will be appreciated that similar masks could be used at the other ends of the print dies 206 if these print dies overlap with other print dies.

This strategy avoids the use of nozzles at the extreme ends of each of the dies 206a1, 206b1, which nozzles may be associated with relatively high failure rates associated with the heating and cooling thereof. The drops are well separated in the print direction, thus reducing disruption of build material due to airflows, as described above.

FIG. 3C shows a second strategy. In this example, a tapered, or ramped, weaving strategy or mask is applied. In some examples, a tapering random distribution, such as a blue noise distribution is used to determine which nozzle dispenses a drop of print agent. However, in general, while the same amount of print agent may be issued to locations corresponding to the overlap region as seen in the scheme of FIG. 3B, this avoids the precise stitching of the scheme of FIG. 3B, and thus may be more robust when considering alignment issues and/or banding in the printed agents. It may also be noted that, through use of such a tapering mask, the use of the nozzles at the ends of the dies 206 may be relatively light.

The particular form of the distribution may be selected according to an intended outcome. For example, a blue noise distribution may be used to minimise appearances of grain. A selection of a particular distribution may be made (for example, white noise, green noise, specific schemes bearing in mind nozzle condition, maintenance and/or life span) may be made.

As discussed above, in some examples, more than one print agent is to be dispensed. While different nozzles of a given print die may be dedicated to a given print agent, if both print agents are distributed simultaneously, adverse airflows between agents are likely to be generated.

FIG. 3D shows a third strategy, in which a second agent is also to be dispensed. In this example, rather than using different columns of nozzles in the same print die, different print dies are used to dispense the different agents. In other words, each print die is dedicated to the ejection of one print agent (at least in a given printing pass). While the first print agent benefits from a maximum separation of the drops in the print direction, the second print agent is distributed from two relatively well separated bars. Moreover, rather than being emitted from the columns of nozzles of a single print bar, the different print agents may be at a relatively increased spacing from one another even when ejected from the same print bar.

In some examples, to further increase the separation, the first and second print agents may be printed in different printing passes.

Thus, in examples herein, the first print agent may be dispensed onto a swath of the layer of build material corresponding to a region of an overlap between print dies partially from the first print die and partially from the second print die, wherein the first print die is provided on a first print bar and the second print die is provided on the second print bar. Moreover, in some examples each print bar may comprise rows of staggered dies wherein the dies of the first rows of the print dies are aligned with one another and the dies of the second rows of the print dies are aligned with one another.

In such examples, a particular print agent may be dispensed from the print dies of a first row of a first print bar and the print dies of a second row of the second print bar. In addition, the print dies of the second row of the first print bar and the print dies of the first row of the second print bar may dispense no print agent in a printing pass in which the particular print agent is being printed, dispense a minimal amount of the particular print agent (for example to reduce a risk of nozzle blockage and/or to compensate for a blocked nozzle) in that printing pass or may dispense a different print agent in that printing pass.

In some examples, the dies of the first row of a print bar overlap the dies of the second row of that print bar/another print bar in an overlap region. In such examples, a weaving scheme, which may comprise a ramp or taper, may be applied to the overlap region.

In some examples, the dies of the given row of a print bar may be dedicated to a given print agent (the first print agent), at least within a particular printing pass. In other words, rather than dispensing different print agents from different columns of nozzles within a print die, each print die may, in a given printing pass, dispense the given print agent and no other print agent. In some such examples the dies of the other row of each print bar may be dedicated to a different print agent (the second print agent). The first and second print agent may be printed in the same printing pass or in different printing passes.

Figure 4:
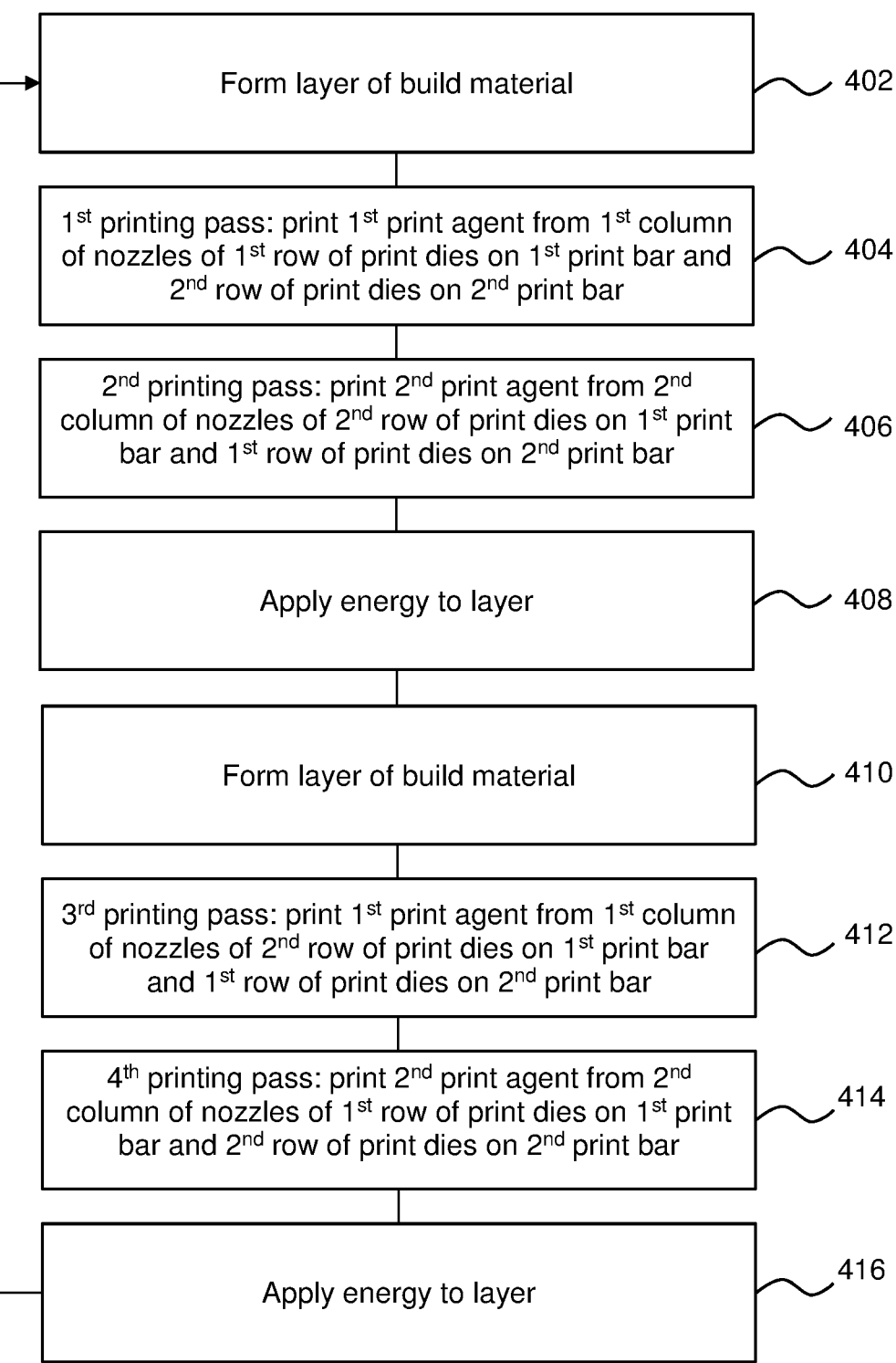
FIG. 4 is an example method of generating an object in additive manufacturing.

FIG. 4 is an example of a method of additive manufacturing using a multi-print bar printer. In particular, in this example, two print bars are provided having the structure shown in FIG. 2. As noted above, additive manufacturing systems may generate objects based on structural design data. This may involve a designer generating a three-dimensional data model of at least one object to be generated, for example using a computer aided design (CAD) application. The model may define the solid portions of the object(s). In some examples, the object model data may describe at least the geometry of object(s) to be generated, for example in the form of a vector model, a mesh model or a voxel model of the object(s). In some examples, the object model data may describe intended object properties, such as colour, strength, density and the like.

To generate a three-dimensional object from the model using an additive manufacturing system, the model data can be processed to generate slices defined between parallel planes of the model. Each slice may define a portion of a respective layer of build material that is to be solidified or caused to coalesce by the additive manufacturing system, and print instructions specifying where print agents are to be placed on that layer may be generated. For example, instructions to eject fusing agents or binding agents where the layer is intended to be solidified may be determined.

In the example of FIG. 4, in block 402, a layer of build material is formed. For example, a quantity of powder-like build material may be distributed onto a print bed or a previously processed layer of build material.

In block 404, in a first printing pass, a first print agent, which in this example is a fusing agent, is printed onto the layer of build material. For example, the print bars may be mounted on a carriage which moves across the layer of build material while print nozzles are selectively controlled to eject some, or no, fusing agent. In particular, in this example, the fusing agent is selectively ejected from the first column of nozzles 208 of the first row 210a of print dies 206 in the first print bar 202 and the first column of nozzles 208 of the second row 212b of print dies in the second print bar 204. No other print dies are used in this printing pass, and, in this example, no other print agents are applied in this printing pass. In the overlap region 216, a blue noise taper mask is applied.

For example, applying the print mask may comprise dividing the print instructions into swaths, wherein each swath may be addressed by a particular print die. Some of the swaths may therefore overlap in an overlap region. Thus, initially, the print instructions may be duplicated in an overlap region. However, the instructions for each swath may have a print mask applied thereto, at least in the overlap region, which may void at least some of the print instructions. The print masks may be complementary such that, for example, for a given location on a print bed which may be addressed by two print dies, the print instructions for ejecting print agent from one of these print dies may be voided, while the print instructions for ejecting print agent from the other of these print dies may be maintained. For example, the masks may be binary masks, wherein a 0 indicates that the print instructions may be voided while a 1 indicates that the print instructions are to be maintained. In the case of a taper mask, the likelihood that a print instruction for a nozzle is to be voided increases the closer that nozzle is to an end of a print die. Of course, for some locations, it may be the case that the print instructions specify that no print agent is to be placed and for such locations application of the print mask will have no effect.

In block 406, in a second printing pass, a second print agent, which in this example is a detailing agent, is printed onto the layer of build material. In this printing pass, the carriage may be moving in the opposite direction than in the first printing pass. In particular, in this example, the detailing agent is ejected from the second column of nozzles 208 of the second row 212a of print dies of the first print bar 202 and the second column of nozzles 208 of the first row 210a of print dies of the second print bar 204. No other print dies are used in this printing pass, and, in this example, no other print agents are applied. In the overlap region 216, a blue noise taper mask is applied.

In block 408, energy is applied to the layer to cause coalescence of the build material. It is intended that the build material which has been printed with the fusing agent is caused to coalesce whereas the build material which has not been printed with fusing agent (but which may, for example, have been printed with detailing agent) remains as separate particles.

In some examples, both print agents may be distributed in the same printing pass. For example, it may be understood that, in some examples of additive manufacturing, the use of detailing agent and fusing agent at a particular location may be at least largely mutually exclusive. In such examples, there is less risk of interference between drops of the different agent types. Therefore, such cases may be particularly suited to printing both types of agents in a single printing pass. However, there are other examples in which a single printing pass may be used to apply both agents.

In this example, the method then continues to block 410, which comprises forming a layer of build material as set out in relation to block 402 above. The method then repeats, but with the agents being ejected by different nozzles of different print bars.

In particular, in block 412, in a third printing pass, the first print agent (i.e., in this example, the fusing agent) is ejected from the first column of nozzles 210 of the second row 212*a* of print dies 206 in the first print bar 202 and the first column of nozzles 210 of the first row 210*b* of print dies in the second print bar 204. No other print dies are used in this printing pass, and, in this example, no other print agents are applied. In the overlap region 216, a blue noise taper mask is applied. Thus the row of print dies used to eject the first print agent is switched with respect to that in the first printing pass.

In block 414, in a fourth printing pass (which may be in the same direction as the second printing pass), the second print agent (i.e., in this example, the detailing agent) is printed onto the layer of build material from the second column of nozzles 208 of the first row 210*a* of print dies of the first print bar 202 and the second column of nozzles 208 of the second row 212*b* of print dies of the second print bar 204. No other print dies are used in this printing pass, and, in this example, no other print agents are applied. In the overlap region 216, a blue noise taper mask is applied. Thus the row of print dies used to eject the second print agent is switched with respect to that in the second printing pass.

The method then proceeds to block 416, which comprises applying energy as described in relation to block 408, and the method loops back to block 402 until the object is formed.

In this way, each nozzle 208 may be used with approximately equal frequency, which may extend the life of the print dies 206. However, each nozzle is dedicated to dispensing a particular type of print agent associated therewith, with the first column of nozzles of each die being dedicated to dispensing the first print agent and the second column of nozzles of each die being dedicated to dispensing the second print agent.

In some examples, the method of FIG. 4 may be adapted such that the print agents ejected in the first and second printing pass are ejected in a single printing pass and the print agents ejected in the third and fourth printing pass are also ejected in a single printing pass. In such an example, in each printing pass each individual print die 206 is used to eject one print agent (and no print dies eject both print agents in a single printing pass). This helps mitigate the generation of airflows which could disrupt the layer of build material and/or the drop trajectory.

Other variants are possible. For example, while different agents may be ejected in different passes as described in FIG. 4, as this may minimise interactions between agents, in some examples all of a first agent may be ejected in a first printing pass for a given layer along with a proportion, for example half, of a second agent. For example, a first printing pass may supply a layer of build material with all of the detailing agent it is intended that the layer receive and half of the fusing agent, with the second half of the fusing agent being delivered in a second printing pass.

Moreover, there may be more than two printing passes to address a single layer. As the amount of agent ejected in a single drop may affect the build material, with larger drops being associated with a greater level of disturbance, the print agent may be distributed over three, four or more passes. In some examples, the number of passes may be determined based on the build material used. For example, a metal powder build material may be made up of smaller and lighter particles than a plastic powder build material. Therefore, while print agent may be distributed in one or two passes, dispensing relatively large drops, for a plastic powder, four passes may be used for a fine metal powder such that the drop volume may remain small. A lower printing speed may also be used to mitigate perturbation of the build material layer. In addition, in examples, an amount of a print agent applied may be less in an earlier printing pass than in a later printing pass. The earlier printing pass may serve to 'wet' the build material using comparatively little print agent, and this may in turn help prevent powder disturbance when printing with a later printing pass. In other words, the same amount of print agent may have less of an impact on wet powder than on dry powder.

Moreover, while FIG. 4 describes different columns of nozzles as being associated with different print agent (the first print agent being printed from the first column of nozzles and the second print agent being printed from the second column of nozzles), the nozzles may be divided in some other way, such that a first subset of nozzles 210 of a given print die 206 may be associated with the first print agent and a second subset of nozzles of the print die 206 may be associated with the second print agent, wherein the first and second subset are mutually exclusive. That said, it may be intended that each print agent can be printed along the full length of a print die and therefore one nozzle of a pair of nozzles identified by their position along the columns may be assigned to each print agent.

In addition, while the method of FIG. 4 describes applying energy to each layer, this may not be the case in all examples. For example, when using a binding agent (for example to bind metal particles together), while it may be the case that each layer is heated in order to remove excess fluid, this may not be the case in all examples. In some examples, a curing process is carried out once all of the layers have been formed and treated with a binding agent. Such a curing agent may cause solvent (or residual solvent) in a binding agent to evaporate, and may cause the particles in the binding agent to cure and bind particles of build material together. Following the curing process, the build material to which binding agent has been applied becomes bound or solidified, forming what is referred to as a green part, which is a relatively loosely bound matrix of particles of build material. The green part may be formed once all of the build material in the fabrication chamber has been heated to a temperature exceeding the curing temperature of the binding agent for a sufficient duration.

After the object or 'green part' is formed, a "de-caking" process may be performed, which involves removing any loose, unbound build material 104 from the green part (i.e. the bound portion of build material) or the fused object. In some examples, green parts may be subsequently placed into a furnace at a high temperature to be sintered. In some examples, sintering involves heating the green part to a particular temperature which is dependent on the nature of the build material being used. In some examples, this causes the material in the green part to solidify and compact, without melting.

Figure 5:
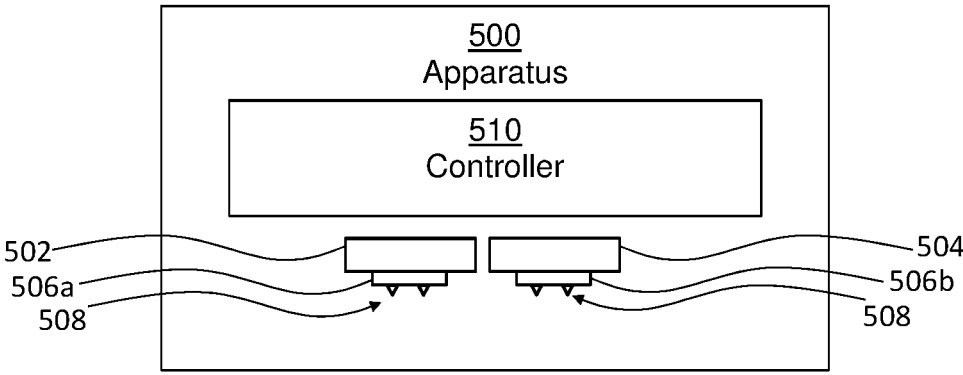
FIG. 5 is an example of apparatus for use in additive manufacturing.

FIG. 5 shows an example of additive manufacturing apparatus 500 comprising a first print bar 502 and second print bar 504. Each print bar 502, 504 comprises at least one print die 506a, 506b, wherein the print dies 506a, 506b each comprise a plurality of nozzles 508, only two of which are visible in the Figure. The first and second print bars 502, 504 may be separated (i.e. spaced) from each other to a printing direction and/or the first and second print dies 506a, 506b may be offset from one another in a direction transverse to a printing direction.

The apparatus 500 further comprises a controller 510 to apply (and in some examples, to generate) print instructions to control which nozzle ejects print agent, wherein the controller 510 is to cause a first print agent to be ejected partially from the print die 506a of the first print bar 502 and partially from the print die 506b of the second print bar 504 in a first printing pass. For example, the print instructions may be intended to cause print agent to be ejected in a pattern so as to cause a layer of an object to be formed, as has been described above. In some examples, the print instructions may have a mask applied thereto (for example by the controller 510).

For example, the controller 510 may cause the apparatus 500 to perform the method set out in relation to FIG. 1 above. In some examples, the apparatus 500 may perform the method set out in FIG. 4 above and/or one of the described variants thereof.

In some examples, the additive manufacturing apparatus 500 may be intended to dispense more than one print agent. In such examples, a first subset of nozzles 508 of a given print die 506 may be dedicated to dispensing a first print agent and a second subset of nozzles 508 of that print die 506 may be dedicated to dispensing a second print agent, wherein the first and second subsets are mutually exclusive. In some examples, the controller 510 may control the additive manufacturing apparatus 500 such that, in a given printing pass, only one of the first and second subsets of nozzles 508 of a given print die 506 dispenses print agent. In other words, only one of the first and second print agents may be dispensed from a particular print die 506 in a given printing pass, although that print die 506 may dispense the other of the first and second print agents in another printing pass.

In some examples, the print bars 502, 504 of the additive manufacturing apparatus 500 may comprise a plurality of print dies 506. In some examples, the print dies 506 each comprise a plurality of nozzles 508 and are arranged in a first and second row, the rows being transverse to a printing direction. In some such examples, the dies 506 in each row may be staggered such that the dies 506 of the first row overlap the dies 506 of the second row in an overlap region. Moreover, in some examples, the dies 506 of the first row of the first print bar 502 are aligned with the dies of the first row of the print dies 506 of a first row of the second print bar 504. In addition, the dies 506 of the second row of the first print bar 502 may be aligned with the dies 506 of a second row of the second print bar 504 in the printing direction. For example, the print bars and dies may have an arrangement of, or similar to, that shown in FIG. 2.

In such an example, in use of the apparatus 500, the controller 510 may, for example, in a given printing pass, apply print instructions to cause a first print agent to be ejected from the dies 506 of the first row of the first print bar 502 and from the dies 506 of the second row of the second print bar 504. Moreover, in that printing pass, the controller 510 may control what print agent is ejected from the second row of dies 506 of the first print bar 502 and the first row of dies 506 of the second print bar 504. For example, the controller may control those print dies to eject a second print agent, a minimal amount of the first print agent (for example to maintain nozzle function or to replace a corresponding blocked nozzle on the other print bar as set out above) or no print agent.

In some examples, in use of the additive manufacturing apparatus 500, the controller 510 may apply a complimentary weaving mask, which may be a taper weaving mask, to the ejection of print agent in the overlap region, for example as explained in FIGS. 3A to 3D. For example, the controller 510 may apply the mask to received print instructions to modify the print instructions for use in generating at least one object using a plurality of print bars.

The additive manufacturing apparatus 500 may comprise additional components, for example any or any combination of a fabrication chamber in which at least one object may be generated, a print bed, print agent reservoirs, a build material distribution system for providing layers of build material, energy sources such as heat lamps and the like, which are not described in detail herein. The print bar(s) and/or print dies for distributing print agents may be provided with channels for receiving print agent and/or ejection components such as heating elements (e.g. resistors) or piezoelectric elements, which may be triggered by the controller 510 to cause ejection of a drop of print agent from a nozzle.

Figure 6:
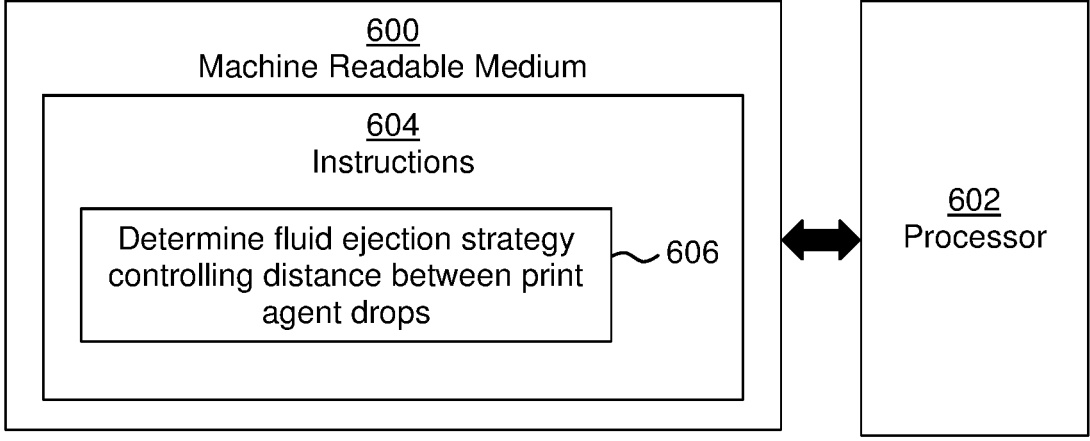
FIG. 6 is a simplified schematic diagram of a machine-readable medium in association with a processor, according to one example.

FIG. 6 shows an example of a tangible machine readable medium 600 in association with a processor 602. The machine readable medium 600 stores instructions 604 which, when executed, cause the processor 602 to carry out certain operations. In this example, the instructions 604 comprise instructions 606 to cause the processor 602 to determine a fluid ejection strategy for an additive manufacturing apparatus in which a distance between ejected fluid drops of a first agent is controlled. In some examples the distance may be controlled in a first direction by assigning at least substantially all of the first print agent to be ejected onto a layer of print agent to be divided between being ejected by a first print bar and second print bar. For example, substantially all of the first print agent to be ejected onto a layer of print agent may be assigned to be ejected by a print die of a first print bar and a print die of a second print bar.

In some examples, the instructions 606 may cause the processor 602 to determine a fluid ejection strategy for an additive manufacturing apparatus in which a distance between ejected fluid drops of a first print agent and a second print agent is controlled by assigning substantially all of the second print agent to be ejected onto the layer of print agent by a third print die of the first print bar and a fourth print die of the second print bar, at least in a given printing pass.

In some examples, the instructions 604 may comprise instructions to cause an additive manufacturing apparatus 500 to carry out any of the blocks of the method of FIG. 1 and/or FIG. 4, or the variants thereof described above. In some examples, the instructions 604 may comprise instructions to cause the processor 602 to act as the controller 510 described in relation to FIG. 5 and/or to control apparatus as described in relation to FIG. 5.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that blocks in the flow charts and/or block diagrams, as well as combinations of the blocks in the flow charts and/or block diagrams may be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices (for example the controller 510) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine-readable instructions may also be loaded onto a computer or other programmable data processing devices, so that the computer or other programmable data processing device(s) perform a series of operations to produce computer-implemented processing, thus the instructions executed on the computer or other programmable devices realize functions specified by block(s) in the flow charts and/or in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. An additive manufacturing apparatus comprising:
first and second print bars that each have first and second print dies, wherein:
the second die of the first print bar is closer to the second print bar than the first die of the first print bar is,
the first die of the second print bar is closer to the first print bar than the second die of the second print bar is, and
the first and second dies of the first and second print bars partially overlap in a direction transverse to direction of travel along a print bar movement axis in an overlap region;
a processor; and
a memory storing instructions executable by the processor to perform processing comprising:
determining a pattern of a first print agent to be applied to a layer of build material;
dispensing, in the overlap region, a first portion of the determined pattern of the first print agent onto the layer of build material from the first die of the first print bar; and
dispensing, in the overlap region, a second portion of the determined pattern onto the layer of build material from the second die of the second print bar.

2. The additive manufacturing apparatus of claim 1, wherein the first and second portions of the determined pattern of the first print agent are respectively dispensed in the overlap region by the first die of the first print bar and the second die of the second print bar according to taper weaving masks.

3. The additive manufacturing apparatus of claim 1, wherein the processing further comprises not dispensing the first print agent in the overlap region from the second die of the first print bar nor from the first die of the second print bar.

4. The additive manufacturing apparatus of claim 1, wherein the processing further comprises, in the overlap region, a second print agent from the second die of the first print bar and from the first die of the second print bar.

5. The additive manufacturing apparatus of claim 4, wherein the second print agent is dispensed in the overlap region by the second die of the first print bar and from the first die of the second print bar according to taper weaving masks.

6. The additive manufacturing apparatus of claim 1, wherein the processing further comprises:
forming successive layers of build material;
dispensing the first print agent onto each layer according to the pattern, wherein the pattern is derived from data modeling at least one object to be generated; and
applying energy to the layer to cause at least one of coalescence or binding of the build material.

7. A non-transitory machine-readable medium storing instructions executable by a processor to perform processing comprising:
determining a pattern of a first print agent to be applied to a layer of build material by an additive manufacturing apparatus within first and second print bars that each have first and second dies, wherein
the second die of the first print bar is closer to the second print bar than the first die of the first print bar is,
the first die of the second print bar is closer to the first print bar than the second die of the second print bar is, and

the first and second dies of the first and second print
  bars partially overlap in a direction transverse to
  direction of travel along a print bar movement axis in
  an overlap region;
dispensing, in the overlap region, a first portion of the
  determined pattern of the first print agent onto the layer
  of build material from the first die of the first print bar;
  and
dispensing, in the overlap region, a second portion of the
  determined pattern onto the layer of build material from
  the second die of the second print bar.

8. The non-transitory machine-readable medium of claim
7, wherein the first and second portions of the determined
pattern of the first print agent are respectively dispensed in
the overlap region by the first die of the first print bar and the
second die of the second print bar according to taper
weaving masks.

9. The non-transitory machine-readable medium of claim
7, wherein the processing further comprises not dispensing
the first print agent in the overlap region from the second die
of the first print bar nor from the first die of the second print
bar.

18

10. The non-transitory machine-readable medium of
claim 7, wherein the processing further comprises, in the
overlap region, a second print agent from the second die of
the first print bar and from the first die of the second print
bar.

11. The non-transitory machine-readable medium of
claim 10, wherein the second print agent is dispensed in the
overlap region by the second die of the first print bar and
from the first die of the second print bar according to taper
weaving masks.

12. The non-transitory machine-readable medium of
claim 7, wherein the processing further comprises:

forming successive layers of build material;

dispensing the first print agent onto each layer according
  to the pattern, wherein the pattern is derived from data
  modeling at least one object to be generated; and applying energy to the layer to cause at least one of
  coalescence or binding of the build material.

* * * * *